United States Patent [19]

Kravitz

[11] 4,107,346

[45] Aug. 15, 1978

[54] DIETARY SALT COMPOSITIONS

[76] Inventor: Hilard L. Kravitz, 402 Doheny Rd., Beverly Hills, Calif. 90211

[21] Appl. No.: 719,913

[22] Filed: Sep. 2, 1976

[51] Int. Cl.$^2$ ............................................. A23L 1/237
[52] U.S. Cl. ................................................ 426/648
[58] Field of Search .................. 426/74, 648, 649, 806

[56] References Cited

U.S. PATENT DOCUMENTS

| | | | |
|---|---|---|---|
| 2,489,759 | 11/1949 | Dunn | 426/649 |
| 2,489,760 | 11/1949 | Dunn | 426/649 |
| 3,514,296 | 5/1970 | Frank et al. | 426/649 |

FOREIGN PATENT DOCUMENTS

| | | | |
|---|---|---|---|
| 1,367,359 | 9/1974 | United Kingdom | 426/74 |

*Primary Examiner*—Raymond N. Jones
*Assistant Examiner*—C. A. Fan
*Attorney, Agent, or Firm*—I. Louis Wolk

[57] ABSTRACT

This invention relates to a dietary salt composition for use as a replacement for salt in foods, and/or as a mineral supplement for use as a dietary adjunct, and method for its preparation, said salt composition to be physiologically balanced so that the proportion of components is such that a balanced composition of vital minerals is ensured and made available in the extracellular fluids of the body. A supplementary and important benefit is to provide adequate amounts of essential minerals which may be partly or marginally deficient in the diet, and which are essential for human nutrition. The basis for this composition is a combination of salts of sodium, potassium, calcium and magnesium in proportions represented by these cations in the extra-cellular fluid compartment of the body, said composition being a carrier for and supplemented by suitable amounts of some or all of the trace elements which are considered essential for human nutrition.

12 Claims, No Drawings

DIETARY SALT COMPOSITIONS

BACKGROUND OF THE INVENTION

The National Academy of Sciences has recognized the need for minerals in human nutrition, and has classified them into two groups: those needed in the diet at levels of 100 mg/day or more, and those needed in amounts no higher than a few mg/day. The latter are called trace elements. Either group may contain elements not present in adequate quantities in the diet. The development of exceedingly sensitive methods of analysis has greatly facilitated the advances in trace element research in recent years. Important new advances are being made in our understanding of the role of mineral elements in the structure of protein and in the activity of many enzymes. Certain criteria have been established to determine the essentiality of a mineral element for human requirements, and some of the factors considered are as follows:

1. The mineral must be more or less ubiquitous, available to and absorbed by animals and plants.
2. The chemical nature must be compatible with some physiological function.
3. The atomic number should fall within those known to be essential to health.
4. It must cross the placental and mammary barriers.
5. It should be of low toxicity when administered in the form in which it occurs naturally.
6. A homeostatic controlling mechanism should be present.

There is reason to believe that the social and physical changes in a man's environment occurring as a consequence of technological developments could have important effects upon trace elements intake by man. The nature and magnitude of such changes are not completely known, and their potential importance is insufficiently appreciated. The World Health Organization has recommended that: (1) an international collaborative program be designed to obtain reliable information on the trace element content of foods; (2) systems be established to monitor the changes in relation to agricultural and industrial development; and (3) full recognition be given to the needs for trace elements in developing standards for foods.

Two trends may lead to an imbalance of trace element nutrition in the future. First, increasing consumption of highly refined or processed foods substantially reduces the intake of essential micronutrients, unless those foods are fortified to concentrations at least equal to those naturally occurring in the foods they replace. Second, human exposure to heavy metal pollutants for which no known need has been established may alter requirements for these trace elements. These essential biological metals are the inorganic counterparts of the essential biological organic nutrients, the vitamins. Unlike vitamins, they cannot be snythesized by living organisms and must be present in the diet.

The four elements that are needed in quantities of 100 mg/day or more, are sodium, potassium, calcium, and magnesium. Sodium is the principal cation of extracellular fluid. The usual adult intake of sodium is 100–300 meq/day, equivalent to 6–18 gm of sodium chloride. Both the body content and body fluid concentration of sodium are homeostatically controlled, moderate intakes being rapidly excreted in the urine while a reduction in intake causes excretion to drop to a very low level.

Potassium is the principal intracellular cation as well as being present in lesser concentrations in the extracellular fluids, and is involved primarily with cellular enzyme function. A deficiency of this cation retards growth. As with sodium, efficient homeostatic mechanisms allow for a fairly wide range of intakes. Adults require about 2.5 g/day. An adequate potassium intake is important during prolonged intravenous feeding, in cases of severe diarrhea, in diabetic acidosis, and in therapy with certain drugs.

An adult body contains about 1200 g of calcium, almost all of which is in the skeleton. Despite the seeming permanence of the mineral deposits in bone, the calcium is constantly being formed and resorbed. About 700 mg of calcium enter and leave the bones each day. The amount of calcium outside bone does not exceed 10 g in the adult. Nevertheless, this small amount of calcium has an important role in controlling the excitability of peripheral nerves and muscle. Calcium is necessary for blood coagulation, for myocardial function, muscle contractility, and for the integrity of various membranes. The importance of calcium in these functions is reflected in the precision with which plasma calcium is regulated. The fluctuations have been reported to be + or − 3%! The level of protein intake influences the absorption of calcium, but in general, excess calcium in the diet may not be absorbed. The FAO/WHO recommended a daily allowance of 400–500 mg/day. Calcium supplementation has induced calcium retention and relieved symptoms of osteoporosis. Of course, pregnancy and lactation increase the requirements for this element.

Magnesium is selectively concentrated in living cells and is also stored in bone. Next to potassium, it is the predominant cation in the cell, and is an essential part of many enzyme systems. It is important in maintaining function in nerves and muscles. With advances in methodology for magnesium analysis, the importance of this element in various disorders has been recognized. Low levels of magnesium occur in alcoholism, and hypomagnesemia has been implicated as the cause of tremors and convulsions in children. There is no evidence that larger than normal intakes are harmful. Magnesium and calcium share several control functions, and magnesium excretion falls as dietary calcium is reduced. Magnesium lack leads to neuro-muscular dysfunction and is sometimes accompanied by behavioral disturbances. The generally recommended allowance is about 300–350 mg/day.

At the present time, 14 trace elements are believed to be essential for human nutrition. These are iron, iodine, copper, zinc, manganese, cobalt, molybdenum, selenium, chromium, nickel, tin, silicon, fluorine, and vanadium. It is probable that other elements will be added to this list as experimental techniques are further refined and applied. Five of the elements in this list have emerged as being essential only in the past 6–7 years. Also, within 5 years of the demonstration of the essential function of chromium and its relation to insulin metabolism, marginal deficiency of this element affecting the health and well being of certain population groups in the U.S.A. was reported by several groups of workers. Further, a supposed adequate level of an essential trace element will be affected by the extent to which it interacts with other trace elements in the body, and with other elements in the environment. The importance of balance in the ratios of trace elements provided can be demonstrated by the following examples of biological interactions: Copper is essential for some aspects of iron utilization. Molybdenum increases absorption of fluoride. Selenium compounds have been shown to counteract the toxicity of organic and inorganic compounds of mercury. An inverse statistical association has been shown to exist between the hardness of drinking water and cardiovascular disease mortality, and it is not now possible to relate this to one specific element. The elements considered most likely to show a relationship are magnesium, calcium, chromium, copper, zinc, selenium and cadmium. Low dietary intakes of calcium and iron may increase the absorption and therefore the toxicity of lead. Zinc has been shown to counteract some of the adverse effects of cadmium, and can reverse cadmium induced hypertension in animals. A low or marginal copper intake may also decrease the tolerance to cadmium. Selenium has a protective effect against the toxicity of cadmium. Magnesium depletion has been shown to impair the homeostasis of both potassium and calcium. Interactions between cobalt and iodine have been demonstrated, and the cobalt concentration in soils, food, and water is inversely related to the incidence of goiter in man and farm animals.

Varied developments in agricultural technology can affect the trace element content of foods. The introduction of new varieties of plants, the use of agricultural chemicals, alterations in feeding practices for farm animals, and other new techniques designed to increase food production and yields may result in changes in the composition of basic items of food. Useful technological innovations are providing new types of food ingredients from unconventional sources. This inevitably results in changes in the dietary supply of trace nutrients. Similarly, with affluence and industrialization, a reduction in calories and energy expenditure takes place, and this reduction may reduce the supply of necessary nutrients. Similarly, there is an increase in the consumption of processed and refined foodstuffs, extracts, and formulated products. Such actions may reduce the content of certain trace elements, increase that of others, or affect their biologic availability. Magnesium, calcium, chromium, copper, zinc and selenium are considered to be the trace elements most likely to show relationships to the mortality, morbidity, and geographical distribution of cardiovascular diseases.

The following comments will serve to briefly summarize the present state of knowledge with respect to the aforesaid essential trace elements.

Iron

Iron is a constituent of hemoglobin, myoglobin, and a number of enzymes, and therefore is an essential nutrient for man. Anemia is not a sensitive indicator of iron depletion, since only after the body stores are depleted does a reduction in hemoglobin concentration occur. Unlike other elements, the body has only a very limited capacity to compensate for deficient intakes, and therefore an adequate supply each day is essential. When the dietary supply is sufficient, the intestinal mucosa regulates absorption to keep the body iron constant. Although iron absorption tends to be increased when iron stores are low, this response is not enough to prevent anemia in people whose intake is marginal, as shown in a nutrition survey done in 1972. In order to provide for the necessary retention of 1 mg/day, an allowance of 10 mg/day has been recommended by the Food and Nutrition Board of the National Research council.

Iodine

Iodine is an integral part of the thyroid hormones which have vital metabolic roles. Iodine deficiency leads to thyroid enlargement or goiter. Authorities agree the most efficient way to supplement dietary iodine is by iodization of salt. The daily requirement for adults is 50–75 ug, with children, pregnant and lactating women requiring more. This amount is the minimum necessary for prevention of goiter; an intake between 100–300 ug is most desirable.

Copper

Copper has been identified as a component of several enzymes essential for nutrition. Deficiencies in infants have frequently been reported, and diarrhea is a common consequence of copper lack. Recent studies suggest that low intakes of copper promote an increase in serum cholesterol, and the relationship with anemia has been known for many years. Spontaneous fractures are common in animals feeding off copper deficient soils or who are given artificially depleted copper diets. Neurological change resembling multiple sclerosis have also been reported in animals having copper deficiencies. Other signs of copper deficiency are depigmentation of the hair, wrinkling of the skin, lowered fertility, and alterations in fat metabolism. An intake of about 2 mg/day has been determined to be adequate for an adult, with higher needs for children.

Zinc

Inadequate zinc intakes produce growth failure, impaired wound healing and impaired taste and smell. Zinc metabolism is related to diabetes, and this element is a vital and necessary ingredient of many enzymes and enzyme systems. The body pool is relatively small, and this accounts for the rapid development of deficiency in experimental animals. Even transient deficiencies can have permanent effects. There are wide areas in the U.S.A. which are deficient in zinc, and some evidence suggests that marginal states of zinc nutrition do exist. Depending on the diet, an adult will require between 5–20 mg/day, with 8–10 mg usually being sufficient to maintain equilibrium.

Manganese

Although absolute evidence of manganese deficiency in man has not been established, there is no question this element is essential for human nutrition. In animals, the main manifestations of deficiency are impaired growth, disturbed reproductive function, skeletal abnormalities, and nervous disorders. These manifestations are similar in all species tested. Manganese has an extremely low toxicity in mammals, and such toxicity has not been reported from food intake, and appears to be virtually impossible except where industrial exposure has occurred. Chronic manganese poisoning has occurred only in miners following prolonged working with manganese ores, where manganese enters the body as oxide dust, via the lungs. Studies indicate that an intake of 2–3 mg of manganese a day will result in positive balance, and satisfy nutritional requirements.

Cobalt

Cobalt is unique in that of all of the trace elements, it is active only when supplied in one form, namely cyanocobalamin or vitamin B-12. Therefore the problem of cobalt supply is primarily a question of the dietary sources and the absorption, rather than of cobalt itself. Although no definite functions have been established other than B-12, interactions between cobalt and iodine have been demonstrated, and workers report that the cobalt concentration in foods, soil and water is inversely related to the incidence of goiter in man and farm animals. The cobalt intakes of adults has been estimated to be anywhere from 150-600 ug/day, and the recommended daily intake of vitamin B-12 is 2. ug/day.

Molybdenum

Molybdenum is necessary for the synthesis within the body of enzymes xanthine oxidase and aldehyde dehydrogenase. Deficient intake in animals has been thought to produce renal calculi, to reduce the growth rate, and to deplete the liver of xanthine oxidase. Although a relationship has been established with dental caries in man, no other specific molybdenum deficiency syndrome has been found except for a significant correlation between molybdenum deficiency in the soil and esophageal carcinoma. Most hexavalent salts, whether soluble or insoluble, are rapidly absorbed; tetravalent salts are poorly absorbed. Equilibrium or positive balance may be maintained if the diet provides 2 ug per kg body weight per day, or 140 ug for a 70 kg adult.

Selenium

Although no definite pathological conditions have been identified as being due to selenium deficiency, evidence indicates that it is an essential trace element. In animals, deficiency of selenium causes impaired growth, fibrotic degeneration of the pancreas, poor hair development, eye changes, and reproductive failure. A deficient diet in primates produces similar changes eventually resulting in loss of weight, listlessness, and death. In human beings, several associations are under study. Some studies indicate that human cancer death rates are higher in areas of the U.S.A. with established low selenium levels, and some recent papers report that selenium compounds may protect against the carcinogenic effect of various chemicals. Further, selenium compounds counteract the toxicity of certain heavy metals, i.e., lead, mercury, and cadmium, and deficiency of this element may unmask the toxicity of small amounts of some metals already present in the body. The exact amount needed for human nutrition has not been established, although in animals species in whom deficiencies have been produced, the dietary requirements of selenium were approximately 0.04-0.10 mg/kg of food.

Chromium

Evidence for chromium deficiency in man is based on the fact that impairment of glucose tolerance is improved by increased chromium intake, and that chromium supplements of 150 ug/day in older subjects have resulted in a restoration of glucose metabolism towards normal. The element apparently acts as a co-factor with insulin. It is involved in carbohydrate utilization, has an effect on lipid and cholesterol synthesis, amino acid utilization, and nucleic acid synthesis. There is a decline of tissue concentration with increasing age, and the low level of dietary chromium in many foods, particularly refined carbohydrates, has led to the conclusion that chromium deficiency in humans may be more common than is generally recognized. Overheating of foods produces complexes of chromium which reduce its absorption. Differences in chromium salts influence greatly the absorption, availability, distribution in tissues, and transport. In general, the simple inorganic compounds such as chromium chloride are poorly absorbed, whereas organic compounds are well absorbed. Toxicity is almost entirely limited to hexavalent chromium compounds. Average urinary loss is 5-10 ug/day, and since this is the major route of excretion, this would be the minimum necessary for replacement. Since absorption can vary and represent as little as 25% of the amount in the diet, higher quantities are recommended, varying from 100 to 500 ug.

Flourine

Flourine is a component of dental enamel and plays a role in its protection against dental caries. This element is present in small but widely varying quantities in soils, water supplies, plants and animals. Failure to grow has been observed in animals deliberately fed a diet deficient in flourine. There is also the possibility that this element is necessary for the integrity of bone. A daily intake of 0.5-1.0 mg/day has been recommended.

Nickel, Tin and Vanadium

Deficiencies of these elements have been produced in experimental animals raised under conditions allowing strict control of possible metallic contamination. Findings suggest that these elements are essential, but as yet their implications for human nutrition are not known, and no estimate of man's requirement can be given.

The product of the invention is planned to contain those minerals about whose importance there is little question. There appears to be no necessity to provide minerals about which there is controversy or those whose precise role in nutrition has not been established, even though some experimental evidence indicates potential usefulness.

Much of the information concerning the role of trace elements in human nutrition has been described in a World Health Organization Technical Report published 1973 as No. 532 "Trace Elements in Human Nutrition".

Other representative publications in this field are the following:

Food Chemicals Codex - 2nd edition Committee on Specification. Food Chemicals Codex. Committee on Food Protection, National Research Council (plus first and second supplements).

Recommended Dietary Allowances. 8th edition, 1974. National Academy of Sciences.

Davies. "The Chemical Significance of the Essential Biological Metals". Thomas (pub) London 1972.

Insofar as the patent literature is concerned, most of the prior art is concerned with such improvements as the introduction of seasoning agents into salt compositions, the combination with ordinary salt of individual trace elements as in U.S. Pat. No. 2,487,759 which is concerned with the halogens, fluorine, bromine and iodine, in formulating low sodium or sodium-free compositions as for example in U.S. Pat. No. 3,306,753, which incorporates potassium as an enriching agent.

The patent to Wolf, 1,998,179 describes a salt mixture containing potassium, calcium and magnesium in addition to sodium, which is isotonic with respect to plant cells, and which when added to foods during cooking, or otherwise, allegedly prevents alteration of color and flavor of foods and thus overcomes the unsatisfactory action of salt alone. There is no intention by Wolf to provide a dietary supplement containing trace elements in suitable proportions for dietary use.

SUMMARY OF THE INVENTION

Applicant has discovered a salt formulation useful as a replacement for conventional table salt, which will have the taste and appearance of table salt, and which can be formulated to provide, in addition to sodium chloride, the essential mineral elements together with trace minerals which are known to be essential or important in human nutrition and metabolism. This formulation is physiologically balanced so that the ratios of the major elements, namely sodium, potassium, calcium and magnesium, are present in the same ratio as they are in body fluids, and the trace elements are present in sufficient concentration to provide significant trace element supplementation. This is achieved by incorporating in the formulation, sodium, potassium, calcium, and magnesium as cations in the ratio of the proportions in which they exist in the extracellular fluids within the human body or in close approximation thereto, and to add to this formulation appropriate amounts of the trace elements in a suitable form. In this way the four major elements are formulated in such form and in such proportions that these provide an effective base, or carrier for the trace elements and the resulting composition can be conveniently and safely utilized.

DESCRIPTION OF THE PREFERRED EMBODIMENTS

In the extracellular fluid compartment of the body, the cations are present in the following proportions expressed as milliequivalents:

| Sodium: | 135–150 meq | or | 92–93.1% |
|---|---|---|---|
| Potassium: | 3.5–5.5 | | 2.4–3.4 |
| Calcium: | 4.5–5.5 | | 3.1–3.4 |
| Magnesium: | 2 | | 1.2–1.4 |
| | 145–163 meq | | 100% |

It is the intent of this formulation to supply the above cations in approximately this ratio, remembering that there is a variability in these ratios, and that these figures represent an approximation. These four elements provided as either mineral or organic salts, make up the basis of the formulation in terms of quantity, and the remainder of the trace elements are present in concentrations designed to provide a reasonable supplementation and to diminish the possibility of deficiencies. The complicated interactions of the various trace elements and their effect on each other have also been taken into account in the formulation. It should also be noted that any elements added in the formulation are in such form that there will be no adverse alteration of appearance, taste, texture, nor will there be any undue biologic effects. Appropriate salts of the various minerals are used to provide the most suitable one for the intended purpose, and the salt itself will be the vehicle for the intended mineral element, and there is obviously a wide choice of available compounds. Another important consideration in the choice of the salt is the biologic availability of that compound. For example, as noted above, some compounds are poorly absorbed or even unavailable unless attention is paid to valency, solubility, or whether organic or inorganic in nature. Examples that are given later are not meant to exclude other salts of the chosen minerals.

It is both practical and simple to provide sodium and potassium as the chloride, but it is not always feasible to provide simple inorganic salts of other cations, and an example of this would be the inapplicability of either calcium or magnesium chloride, e.g. In this situation, the dilemma is resolved by the use of organic salts of these cations, such as the glutamates, lactates, tartrates, gluconates, or other salts found suitable by reason of solubility, moisture absorption, crystalline structure, etc. The formulation would also have to take into account the molecular weight of the organic salt, since an unusually high molecular weight could have profound effects on the final formula.

In human blood and tissue fluids, sodium and potassium exist in an approximate ratio of 140 meq sodium to 4.5 meq potassium. This does not take into account intracellular ratios nor other important extracellular ions such as calcium and magnesium as well as other trace elements to be enumerated later. There can exist a normal variation in the ratios of sodium and potassium so that there may be 25–43 times as much sodium as potassium, and still approximate normal extracellular fluid concentrations.

Assuming a meq ratio of sodium to potassium of 43:1, and using the chloride salts, then the following calculations apply:

1 mmole of NaCl = 58.5 × 43 = 2516 mg
1 mmole of KCl = 74.5 × 1 = 74.5 mg

Therefore to provide a meq ratio of sodium to potassium of 43:1 using the chloride salts of each, would mean that a weight ratio of 34:1 would be needed.

It becomes important to use salts of the other chief elements, namely calcium and magnesium, that would provide adequate quantities of these cations, retain the desired characteristics enumerated previously, and yet not dominate the formulation. It is also proposed to vary the formula within physiological parameters to emphasize the ratios providing the greatest palatability. For example, since sodium, potassium, calcium, and magnesium exist in a range of normal values, it is planned to use the ratios to provide the best formula in all respects that will still maintain a similarity to that existing in physiological fluids in the body. Extending the above calculations relative to sodium and potassium, and maintaining the ratio of 43:1 for these elements, the following are appropriate ratios of the four primary minerals expressed as milliequivalents: Example:

Na; 150 meq
K; 3.5 meq
Ca; 4. meq
Mg; 1.5 meq

Extending this, and using NaCl, KCl, Calcium lactate, and magnesium gluconate as examples of applicable salts, a formula can be expressed as follows:

1 mmole NaCl = 58.5 mg = 1 meq
1 mmole KCl = 74.5 mg = 1 meq
1 mmole Ca lactate = 109.1 mg = 2 meq
1 mmole Mg gluconate = 415 mg = 2 meq 1 mmole of calcium lactate provides 2 meq of Ca, or 1 meq of calcium 54.55 mg, and one meq of magnesium requires 207.5 mg of magnesium gluconate. Translating this into weights and percentages for a desired formula then:

| Salt | Concentration × weight | | Unit wt. | % |
|---|---|---|---|---|
| NaCl | 150 × | 58.5 | 8775 | 91.7 |
| KCl | 3.5 × | 74.5 | 261 | 2.7 |
| Calcium lactate | 4 × | 54.55 | 218 | 2.3 |
| Magnesium gluconate | 1.5 × | 207.5 | 311 | 3.3 |

-continued

| Salt | Concentration × weight | Unit wt. | % |
|------|------------------------|----------|---|
|      |                        | 9565     | 100.0% |

The addition of the trace elements would not pose a problem in formulation, since the quantity of these would be relatively insignificant compared to the four cations noted above. The requirements of these are for the most part expressed in microgram quantities. The very small amounts of these trace elements would as a corollary allow a wider latitude in the available compounds. The trace elements proposed to be added and their relative concentrations as well as suggested compounds are outlined below. A suggested supplementation would provide about ¼-½ of the estimated daily requirements in 10 gm of the product.

Iron

Ferrous gluconate or ferrous sulfate are desirable salts, since either may fulfill the necessary criteria. The recommended daily allowance of iron is 10 mg/day in order to provide for the necessary retention of one mg of iron. 2.7 mg of anhydrous ferrous sulfate or 8.0 mg of ferrous gluconate contain 1 mg of iron. It is important to use the ferrous stable salts, since the ferric form is not utilized by the body. Since iron is not often a deficient element, only minor supplementation is needed. 10 mg of $FeSO_4$ will provide 4 mg of elemental iron in 10 gm of product, or a concentration of 0.1%. To obtain the same amount of iron using ferrous gluconate would require a concentration of 0.34%. A range of 2-5 mg for each 10 gram portion of the salt composition would be preferred.

Iodine

Iodine is present in iodized salt in a concentration of 0.01%, or one part in 10,000. One gram of iodized salt provides 100 mcg of iodine, an amount considered to be the desirable daily intake. If a concentration of 0.006% of sodium iodide is used, this would provide approximately 50 mcg of iodine per gram of product. A range of 20-50 mcg per 10 gram portion of the salt composition is considered satisfactory.

Copper

Copper gluconate is a desirable salt since it is an organice salt, is well absorbed, and is listed in the Food Chemical Code; a concentration of 0.07% copper gluconate will provide one mg of copper per 10 gm of product, and this would be considered satisfactory supplementation. A range of ½-1 mg for each 10 gram portion of the salt composition would be preferred.

Zinc

Desirable salts of zinc would be either the gluconate or the sulfate. Other zinc salts would be the citrate, lactate, phosphate, or tartrate. The gluconate salt is readily available, non-toxic, and about 0.2% would provide 3 mg of elemental zinc in 10 grams of product. 2-10 mg of zinc for each 10 gram portion of salt would be satisfactory.

Manganese

Several of the manganese salts may be suitable for inclusion in the formula by virtue of solubility, availability, and absorption. Among these are manganese citrate, manganese lactate, manganese gluconate, as well as other organic salts. 0.08% of manganese gluconate will supply 1 mg of elemental manganese in 10 gm of product. ½-2 mg of manganese for each 10 gram portion of salt mixture would be suitable.

Molybdenum

Molybdenum sesquioxide has had use in medicine combined with ferrous sulfate for treatment of iron deficiency anemia, and therefore in this form would be suitable as a source of this element. 0.01% would provide approximately 1 mg of this element in 10 gm of this product. 50-100 mcg of molybdenum per 10 gram portion of salt mixture would be suitable.

Chromium

Biological activity as well as the metabolism of chromium depend on the form in which chromium is bound, since it has been determined that the absorption of simple inorganic compounds is poor, but that certain organic compounds are well absorbed and readily available to the body. Therefore, the form in which this vital element is supplied in effect determines its availability. The trivalent form of this element is necessary for its metabolism. In order to assure assimilation of this element, it is proposed to combine one of the chromic salts such as the acetate or chromium oxide with either one of the two amino acids, such as glycine or glutamic acid. Such a complex has been shown to exhibit physiological activity. An alternative to this method would be the extraction of the active chromium complexes from brewer's yeast with 50% ethanol, evaporating the ethanol, and adding the resultant compound to the formula. Since average urinary loss is 5-10 ug/day, a concentration of 0.01% of either of the above would provide adequate quantities of this element. 50-150 mcg of chromium per 10 gram portion of the salt mixture would provide satisfactory supplementation.

The addition of cobalt, flourine, selenium, nickel, tin or vanadium is not considered essential at this time for reasons outlines in the discussion of each of these elements previously. However, as our knowledge of these elements is broadened, and their metabolic role is clearly elucidated, one or more may be considered for inclusion in the formula. The total amount of the trace elements included is, generally less than 0.5%, examples of which are as follows:

|                     | Range        | typical formulation |
|---------------------|--------------|---------------------|
| sodium chloride:    | 85–95%       | 91.264%             |
| potassium chloride: | 0.5–3%       | 2.687               |
| calcium lactate:    | 0.5–4%       | 2.289               |
| magnesium gluconate:| 0.5–3.5%     | 3.284               |
| ferrous sulfate:    | 0.001–0.1%   | 0.100               |
| sodium iodide:      | 0.005–0.1    | 0.006               |
| copper gluconate:   | 0.02–0.1     | 0.070               |
| zinc gluconate:     | 0.05–0.5     | 0.200               |
| manganese gluconate:| 0.05–0.2     | 0.080               |
| Molybdenum oxide:   | 0.005–0.05   | 0.010               |
| chromium complex:   | 0.005–0.05   | 0.010               |
|                     |              | 100.000             |

The salt composition of the invention is formulated by intimately mixing the ingredients by known methods. For example, the individual components may be ground to a suitable degree of fineness and then admixed in the dry state, or may be ground together in a mill. A wet method may be used in which the ingredients are dissolved and/or suspended in water, and the water then removed by evaporation, as by spray drying or freeze drying. Another proven effective method is to add small quantities, say less than 1% of a saturated edible oil to the mixture of crystalline particles and mixing so that the fine particles of the various elements adhere to each other in the same ration in which they were compounded. Each of these methods permits even distribution and prevents stratification and separation of compounds of varying densities. More particularly, preferred methods of preparation include the following:

(a) The particles of the selected compounds are ground to the desired particle size, wetted with water or a non-toxic solvent to make a slurry, dried to agglomerate the mixture, and then re-ground to particulate form.

(b) The salts are dissolved or dispersed in water or other suitable liquid, and the solution or dispersion is then spray dried. As an alternative, freeze drying followed by grinding may be used.

(c) The use of a vegetable oil as mentioned above is effective in ensuring that particles of minor ingredients will adhere to and remain distributed with the particles of the major ingredients.

The product of the invention can be utilized as a condiment or seasoning agent in place of ordinary table salt. It may be added to processed foods during canning, as in the case of canned vegetables or in the making of bread or sausage as a replacement for salt. Even in the case of products where salt is not normally added as an ingredient, suitable quantities of the product of the invention may be incorporated in order to introduce desired proportions of the trace elements.

What is claimed is:

1. A dietary salt composition for use as a replacement for salt in foods and as a dietary supplement which comprises a base formulation of the essential mineral element cations, sodium, potassium, calcium and magnesium in the form of physiologically acceptable compounds thereof in the proportions corresponding substantially to the proportions of these elements in the extra-cellular fluids of the human body, said proportions based on the cations comprising about 92–93.1% sodium, 2.4–3.4% potassium, 3.1–3.4% calcium and 1.2–1.4% magnesium, said base formulation acting as a carrier and having intimately associated therewith at least one of the trace elements known to be essential in the human diet, said trace elements being incorporated in proportions to supply at least about 20% of the recommended daily allowance of said trace elements as set by the National Academy of Sciences for each 10 gram portion of the salt composition.

2. A dietary salt composition according to claim 1 wherein the trace elements are selected from the group consisting of iron, copper, zinc, iodine, manganese, molybdenum and chromium.

3. A dietary salt composition according to claim 1 wherein the trace element is zinc.

4. A dietary salt composition according to claim 1 wherein the trace element is chromium.

5. A dietary salt composition according to claim 1 wherein the trace elements are zinc and chromium.

6. A salt composition according to Claim 2 wherein the trace elements are in the following approximate proportions per ten gram portion thereof: iron 2–5 mg, iodine 20–50 micrograms, copper ½–1 mg, zinc 2–10 mg, manganese ½–2 mg, molybdenum 50–100 mcg, chromium 50–250 mcg.

7. A salt composition according to claim 2 wherein the trace elements include in addition at least one element selected from the group consisting of cobalt, fluorine, selenium, nickel, tin and vanadium.

8. A method for producing a salt composition for use as a human dietary supplement which comprises intimately admixing physiologically acceptable compounds of sodium, potassium, calcium and magnesium in such proportions as these elements are present as cations in the extra-cellular fluids of the human body, said proportions being about 92–93.1% sodium, 2.4–3.4% potassium, 3.1–3.4% calcium and 1.2–1.4% magnesium together with at least one physiologically acceptable compound of an essential trace element selected from the group consisting of iron, copper, zinc, iodine, manganese, molybdenum and chromium in the proportions of at least 20% of the recommended daily allowance of each said trace element as set by the National Academy of Sciences for each 10 grams of said composition.

9. The method of producing food products suitable for introducing essential elements into the human diet which comprises adding to said food products which are consumed in the human diet a salt mixture comprising physiologically acceptable salts of sodium, potassium, calcium and magnesium in proportions based on the cations corresponding to those in which said cations are present in the extra-cellular fluids of the human body, said proportions being about 92–93.1% sodium, 2.4–3.4% potassium, 3.1–3.4% calcium and 1.2–1.4% magnesium together with at least one physiologically acceptable compound of an essential trace element selected from the group consisting of iron, copper, zinc, iodine, manganese, molybdenum and chromium in the proportions of at least 20% of the recommended daily allowance of each said trace element as set by the National Academy of Sciences for each 10 grams of said composition.

10. A method according to claim 8 wherein the compounds of the formulation are ground to a desired particle size, admixed and formed into a liquid slurry, then dried to agglomerate the mixture, and thereafter re-ground to form a particulate mixture.

11. A method according to claim 8 wherein the compounds of the formulation are admixed in the form of fine granular particles in the presence of 1% or less of an edible oil.

12. A method according to claim 8 wherein the compounds of the formulation are dissolved in a suitable solvent and spray dried to form a fine particulate mixture.

* * * * *